United States Patent [19]
Oldfield et al.

[11] Patent Number: 5,497,476
[45] Date of Patent: Mar. 5, 1996

[54] SCATTER-GATHER IN DATA PROCESSING SYSTEM

[75] Inventors: Clive S. Oldfield, Southampton; Nicholas Shaylor, Salisbury, both of England

[73] Assignee: International Business Machines Corporation, Armonk, N.Y.

[21] Appl. No.: 125,051

[22] Filed: Sep. 21, 1993

[30] Foreign Application Priority Data

Sep. 21, 1992 [GB] United Kingdom .................. 9219949

[51] Int. Cl.$^6$ ........................................ G06F 13/22
[52] U.S. Cl. ................... 395/439; 395/411; 364/DIG. 1
[58] Field of Search ............................. 364/200 MS File, 364/900 MS File; 395/400, 425, 411, 439, 250

[56] References Cited

U.S. PATENT DOCUMENTS 5,179,667  1/1993  Iyer .......................................... 395/275
5,251,303  10/1993  Fogg, Jr. et al. ........................ 395/275

OTHER PUBLICATIONS

"NCR 53C720 SCSI I/O Processor", Programmer's Guide by NCR, 1991, pp. i–vi, 1–1 through 1–6, 4–1 through 4–20, and 5–1.
IBM Technical Disclosure Bulletin vol. 33, No. 10B Mar. 1991, New York US pp. 248–252 "Method of using scatter/gather indirect list in Micro Channel computer systems".
Patent Abstracts of Japan, vol. 012, No. 501 (P–776) 25 Oct. 1988 and JP–A–63 142 416 (Fujitsu) 14 Jun. 1988 * Abstract *.
IBM Technical Disclosure Bulletin, vol. 31, No. 12 May 1989, New York US, pp. 267–268 "Storage subsystem combined header/data transfer technique".

*Primary Examiner*—Tod R. Swann
*Assistant Examiner*—Hiep T. Nguyen
*Attorney, Agent, or Firm*—Owen J. Gamon

[57] ABSTRACT

A method and apparatus that transfers data between system memory which is arranged in pages and an attached storage system. In such a paged memory, data which crosses pages having contiguous virtual addresses may map to data which crosses discontiguous physical pages. Scatter-gather is advantageously employed in such a system in order to achieve the transfer data directly between, memory and storage usually by Direct Memory Access (DMA). A secondary storage device which supports scatter-gather usually includes hardware which will perform the necessary calculations to transfer the data to and from the correct locations in physical memory. The technique of the present invention is useful with storage systems that do not support scatter-gather and comprises determining for each data transfer the identity of any requested sector which lies completely within a physical page and the identity of any sector which crosses boundaries between discontiguous physical pages; and for those sectors which lie within a physical page, transferring the sectors directly between secondary storage and memory by DMA; and for those sectors which cross said boundaries, transferring each sector to either the memory or secondary storage via an intermediate buffer.

6 Claims, 2 Drawing Sheets

SCATTER-GATHER IN DATA PROCESSING SYSTEM

FIELD OF THE INVENTION

This invention relates to the field of data processing systems having paged memory.

BACKGROUND OF THE INVENTION

Paging is a technique used in many virtual memory computer systems for managing virtual memory as fixed-length blocks called pages. An example of a system which supports a paged memory environment is the IBM OS/2 V 2.0 operating system.

The transfer of data between paged primary storage and secondary storage in the form of a data storage device is advantageously performed by Direct memory Access (DMA), which is a technique for moving data by means of a DMA controller, without any interaction from the processor. DMA operations are initiated by the processor, but do not require the processor for the data transfer. A DMA device is a device which incorporates a DMA controller and is thus able to transfer data directly from the disk to primary storage by DMA.

A paged memory environment poses a problem for devices that rely on DMA for data transfers. Most existing DMA devices assume that physical memory is contiguous. In the paged environment, however, I/O buffers that are contiguous in the virtual address space are usually composed of discontiguous physical pages. Scatter-gather I/O is a mechanism for transferring blocks of data to and from a buffer whose pages are physically discontiguous. A gather write operation writes a physically discontiguous I/O buffer to a contiguous range of sectors on the secondary medium. A scatter-read operation reads a contiguous range of sectors from the secondary medium to a physically discontiguous buffer.

DMA devices that support scatter-gather are able to DMA all data specified in an I/O request straight into primary storage, with the scatter-gather hardware contained therein determining the location in physical memory into which the data is to be transferred. In OS/2 V 2.0, the kernel generates scatter-gather list which maps the contiguous virtual address to discontiguous physical addresses. The device driver associated with a DMA device that supports scatter-gather uses this list to DMA the requested data between storage and primary storage. An example of a DMA device which implements scatter-gather is the IBM PS/2 SCSI adapter.

For those peripheral devices that do not support scatter-gather, one mechanism employed to move data from a secondary storage device to primary storage is for the whole I/O request to be read into an intermediate buffer, from where it is copied into the Application address space. For a write operation, the whole I/O request is copied into the intermediate buffer and then written to storage, in order to make optimum else of the device, there will commonly be three I/O operations being processed concurrently. These are (i) the I/O operation currently being performed, (ii) the I/O operation which has just completed and returning status and (iii) the I/O operation being prepared for when the current I/O completes. Thus, to make optimum use of the device, it may be necessary to provide three intermediate buffers per disk, each one of which may need to be large enough to buffer a whole I/O operation. If only one buffer is allocated per disk then only one I/O operation can be performed at once thus impacting the disk to primary storage data transfer rate. Furthermore, there is an increase in processor overhead due to the large amount of data that is copied by the processor into or out of the intermediate buffer.

In the OS/2 V2.0 environment, the OS/2 kernel recognizes from the device driver that the device does not support scatter-gather and accordingly the generated scatter-gather list will contain only entry.

SUMMARY OF THE INVENTION

The present invention seeks to ameliorate the disadvantages of prior or systems in which the system memory is arranged in pages and the secondary storage does not support scatter-gather. Accordingly, the present invention provides, in one aspect, a method of transferring data between primary storage and secondary storage in a data processing system, the primary storage being divided into pages in both physical and virtual address spaces, the method comprising: requesting from a program running on a processor in the data processing system a data transfer comprising at least one sector in said virtual address space; determining for each data transfer the identity of any requested sector which lies completely within a physical page and the identity of any sector which crosses boundaries between discontiguous physical pages; and for those sectors which lie within a physical page, transferring the sectors directly between secondary storage and primary storage by DMA; and for those sectors which cross said boundaries, transferring each sector to either the primary storage (during a read) or secondary storage (during a write) via an intermediate buffer.

During a data transfer from primary storage to secondary storage (write operation) and for each sector which has been determined as crossing the boundary between discontiguous physical pages, the method preferably further comprises: copying, under the control of the system processor, a portion of the sector from one physical page into the intermediate buffer and copying the remaining portion of the sector from the non-contiguous physical page into the buffer; and transferring the sector from the intermediate primary storage to secondary storage by DMA.

During a data transfer from secondary storage to primary storage (read operation) and for each sector which crosses a boundary between discontiguous physical pages, the method comprises transferring the sector to the intermediate buffer by DMA and copying a portion of the sector into the tail of one physical page and copying the remaining portion of the sector into the head of the non contiguous page under the control of the system processor.

Thus using the technique of the present invention, when the data transfer (I/O) request is within a contiguous set of pages, all the data is DMA'd directly into primary storage starting at the address specified by the I/O request.

When the data transfer request is aligned, on a sector boundary and traverses a number of discontiguous physical pages, then the I/O request is split into a number of smaller requests equal to the number of traversed pages and the data for each smaller request is transferred directly between primary storage and storage by DMA.

When the I/O request crosses a number of discontiguous physical pages and is not well aligned on a sector boundary, the sectors wholly within a page are DMA'd directly between primary storage and storage and the sectors which cross page boundaries are transferred between primary storage and storage via an intermediate buffer.

In a second aspect of the invention there is provided a data processing system suitable for use with a secondary storage device which does not support scatter-gather, the processing system including means for implementing the method of the present invention when transferring data between system primary storage and the storage device.

Thus, using the method and apparatus of the present invention, the data transfer rate is increased and the processor overhead is reduced with respect to former systems in which the primary storage is arranged in pages and the attached secondary storage does not support scatter-gather. The technique of the present invention is optimized for use with for disk subsystems that maintain a read-ahead buffer in fast semiconductor memory, and which are capable of back-to-back, write operations that will not lose a disk revolution per transfer.

A preferred embodiment of the invention will now be described, by way of example only, with reference to the accompany drawings.

DETAILED DESCRIPTION OF THE PREFERRED EMBODIMENT

Figure 1:
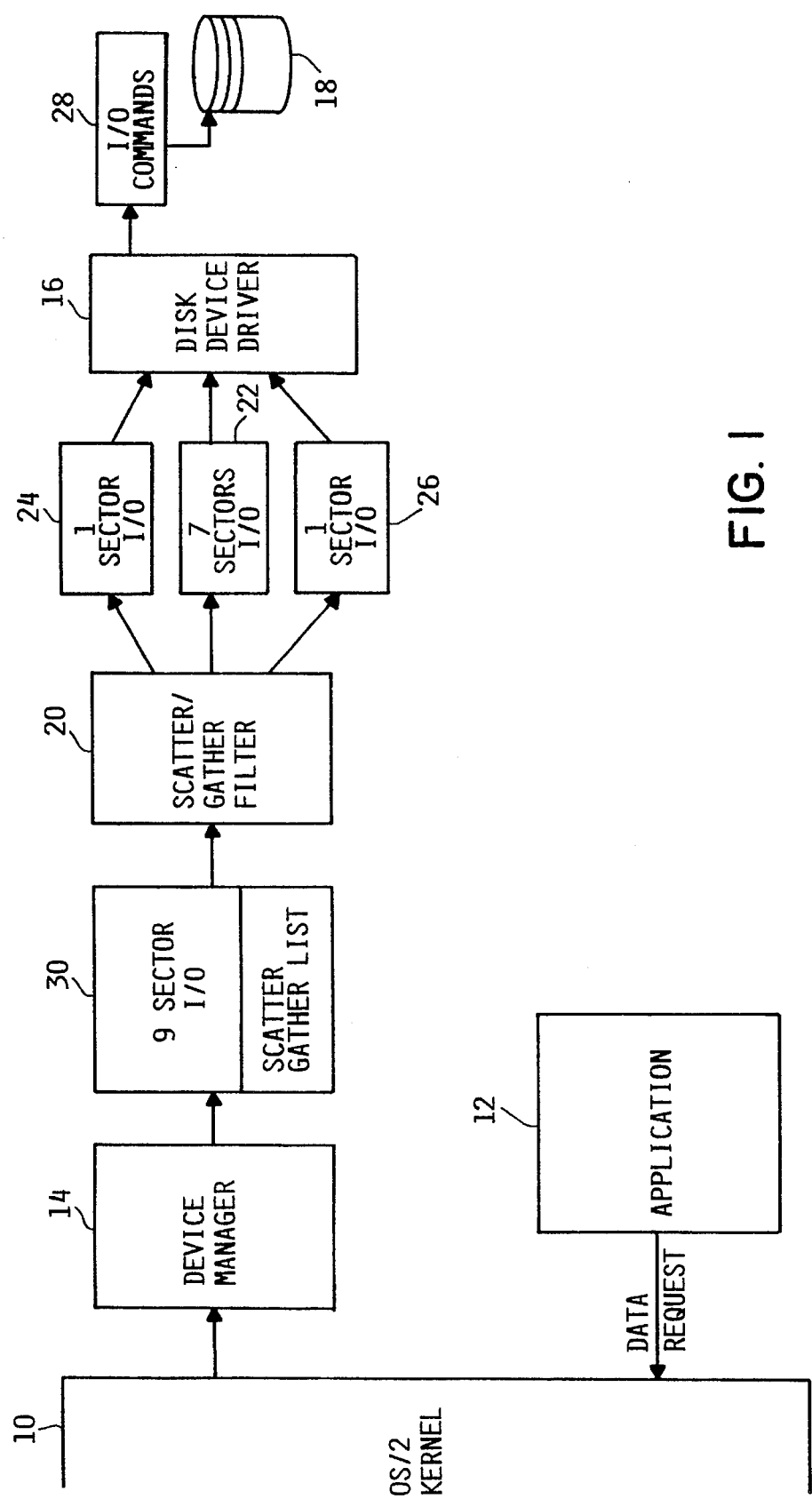
FIG. 1 shows, in block diagrammatical form, a system which provides scatter-gather capability according to the present invention.

The OS/2 operating system is made up of a number of functionally interconnected components, several of which are shown in FIG. 1. At the heart of the OS/2 structure is the OS/2 kernel 10 which contains the control program that runs with supervisor privileges. The kernel uses device drivers to access the systems hardware resources including any peripheral devices connected to the system hardware. Applications 12 running on the system processor (not shown) make requests for data onto the OS/2 kernel via the OS/2 API. The OS/2 operating system, including OS/2 device drivers, described in greater detail in a number of publications including 'The Design of OS/2' by Deitel and Kogan (ISBN 0-201-54889-5).

OS/2 V2.0 includes a modular disk device driver system which has a Device Manager 14 (DM) that looks to the OS/2 Kernel like a traditional device driver, but is a stub onto which is connected modules called Adapter Device Drivers (ADDs), one of which is shown in FIG. 1 as disk device driver 16 which issues I/O commands to disk storage device 18. The disk device driver and disk storage device of FIG. 1 do not include hardware for implementing scatter-gather. In the remainder of the description such a device will be referred to as a non-SG device. Although FIG. 1 shows only a single storage device, it should be appreciated, that the technique of the present invention finds equally effective use with Disk Subsystems comprising several disk storage devices.

In OS/2 V2.0 provision has been made for the interposition of additional modules known as ADD filters between the DM and the ADD which may be provided to perform some value added function like encryption for example. The scatter-gather filter 20 of FIG. 1 is such an ADD filter and operates to make the downstream non-scatter/gather disk device driver appear to have scatter/gather capability. The manner by which this is achieved is described below.

Each I/O request from an application specifies an integral number of sectors to be transferred between disk and application memory. An I/O request can span a number of 4K pages which although contiguous in the virtual address space are not necessarily physically contiguous. If it were possible to guarantee that the I/O request always started on a sector (512 byte) boundary, the job of emulating scatter/gather would simply be to chop up each I/O request received by the device driver into a number of smaller requests with adjusted disk and primary storage addresses. Unfortunately this not the case and an I/O request can start at any byte within a page. In general, an I/O request falls into one of three categories.

1) The whole I/O request starts and finishes in one or more contiguous pages.
2) The I/O request is not in a set of contiguous pages but is well aligned on sector boundaries.
3) The I/O request is not in a set of contiguous pages and is not well aligned on sector boundaries.

The scatter-gather filter implements an algorithm which processes requests according to their category in the most efficient manner.

For I/O requests falling into the first category, the filter algorithm determines from the scatter-gather list that the request traverses contiguous physical pages and accordingly passes the I/O request unchanged to the disk device driver. The disk device driver causes the storage device to DMA the data directly from the disk to the application memory beginning at the single physical address specified in the scatter-gather list.

For I/O requests of the second type, the scatter-gather list generated by the OS2 file system indicates that the pages traversed by the request are not physically contiguous. The I/O request is chopped by the scatter gather filter into a number of smaller I/O requests equal to the number of sectors traversed by the original I/O Request. The sectors in each page are DMA'd directly to or from the start physical addresses specified in the scatter-gather list for each non-contiguous physical page. Thus all the data is DMA'd between application memory and disk storage with the resultant optimization of throughput. Without the scatter-gather filter, I/O requests of the second type would necessitate the DMA transfer of the whole request into an intermediate buffer followed by the copying by the processor from the buffer into the application memory. It will be appreciated that by providing such a scatter-gather filter for use with non-SG devices, a significant increase in data transfer speed will be achieved while avoiding the need to provide relatively expensive scatter-gather hardware in the device.

I/O requests of the third category are not as straight forward as those of the first and second categories and require more processing by the scatter-gather filter.

The processing of an I/O read request which is not in a set of contiguous pages and which is not aligned on sector boundaries will now be described in greater detail with reference to FIGS. 1, 2, & 3. In the following example, the transfer requested by the application is nine sectors in length. The nine disk sectors, each 512 bytes long, are shown in FIG. 2 as sectors A to I.

Figure 2:
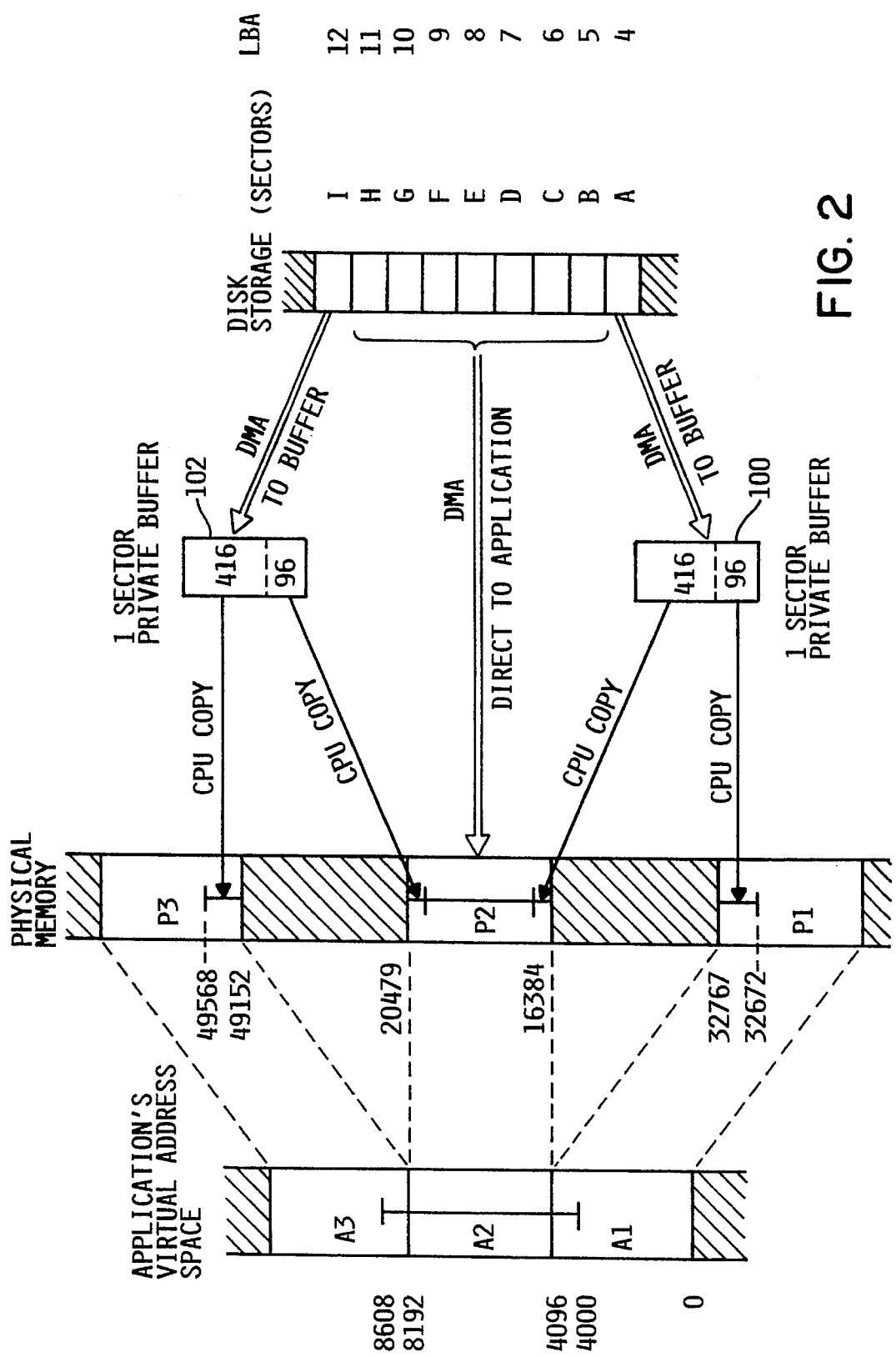
FIG. 2 is a schematic of the transfer of data between disk and application memory.

It can be seen from FIG. 2 that the first page (A1) of the application's virtual address space 0–4095 maps to physical addresses 28672-32767 (4K bytes). Thus virtual address 4000 is at physical address 32672. The second page (A2) of the application's virtual address space 4096–8191 maps to Physical addresses 16384 to 20479 (4K bytes). The third page (A3) of the applications virtual address space 8192–12287 maps to physical addresses 49152–53248 (4K bytes). Thus virtual address 8608 is at physical address 49568. The mapping of virtual to physical address is contained in the scatter-gather list generated for each I/O request by the OS/2 file system. The scatter-gather list for the present example is shown in the following table:

| Virtual Address | Physical Address | Length (bytes) |
| --- | --- | --- |
| 4000 | 32672 | 96 |
| 4096 | 16384 | 4096 |
| 8192 | 49152 | 416 |

As can be appreciated from FIG. 2, sectors A and I straddle page boundaries. The first 96 bytes of each of these sectors needs to be copied to the end of one page, and the remaining 416 bytes need to be copied to the start of a different page. In the algorithm of the present invention, each I/O request 30 issued from the OS/2 kernel via the device manager is chopped into I/O requests of two different types. A first type is for sectors that fit totally within a page, and a second type is for single sectors that cross page boundaries. The purpose of dividing the I/O request up like this is to separate the parts of the I/O that can be DMA'd into the application memory from that which cannot.

For each page specified in the scatter-gather list, the scatter-gather algorithm implemented in the filter determines the maximum number of sectors that can be transferred without going over a page boundary. Simple arithmetic calculates the logical block address and number of such a run of sectors. For each run of sectors, the filter issues a single I/O request to the disk device driver which in turn causes the disk storage device to DMA the data specified by that request directly to application memory. In the present example, since sectors B through H are completely contained within a single page, the filter issues a seven sector I/O request 22 to the disk device driver which specifies the start address in memory to which the sectors are to be transferred. These seven sectors are DMA'd directly to the application's address space.

For each of sectors A and I, which cross non-contiguous physical pages (P1 and P2 for sector A and P2 and P3 for sector I) the filter issues two single sector I/O requests 24, 26 to the disk device driver. Each I/O command 28 issued by the device driver specifies the DMA address of the intermediate buffer 100, 102 to which the sector is to be transferred and the location of the sector on the disk.

In response to an I/O command from the device driver, sector A, which crosses physical pages P1 and P2 is DMA'd into 512 byte private buffer 100. The system processor then copies the first 96 bytes of the sector into the application address space starting at 4000 which corresponds to a physical address of 32762 in page P1. The remaining 416 bytes are copied into the application address space starting at 4096 which corresponds to physical address 16384 in page P2.

In response to an I/O command from the device driver, sector I, which crosses physical pages P2 and P3 is DMA'd into 512 byte private buffer 102. The first 96 bytes are copied under the control of the processor to virtual address 8096 (corresponding to physical address 20479 in page P2) onwards and the last 416 bytes are copied to virtual address 8192 (corresponding to physical address 49152 in page P3) onwards. Thus, in this example, the bulk of the data (7 sectors) is transferred in the most efficient manner by DMA and it is only necessary to transfer two sectors via the intermediate buffer.

For larger I/O requests which cover a larger number of pages, the principle of operation is the same. The I/O request is split, by the scatter-gather filter, into a number of smaller requests of the two different types detailed above. Each I/O request from the filter which relates to a number of consecutive sectors within a page is DMA'd directly into memory and each I/O request relating to a single sector which crosses a non-contiguous page boundary is transferred between primary and secondary storage via an intermediate buffer.

Taking the example of an I/O request from the application which covers six pages and traverses five non contiguous physical boundaries, there will be six I/O requests of the first type and five I/O requests of the second type issued to the device driver (assuming that in the first and sixth pages, there is at least one complete sector as well as the sector crossing the page boundary). If the storage device is capable of processing only one I/O command at a time, as is the case with older storage devices, then it will only be necessary to provide one 512 byte intermediate buffer for the device. If however, the storage device is capable of processing three I/O commands at the same time (the I/O command currently being performed, the I/O command which has just completed and returning status and the I/O command being prepared for when the current I/O completes), then each disk needs only to have one 1K buffer (two sectors) permanently allocated. For devices which do not support scatter-gather and which do not have the benefit of the present invention, it could be necessary to have a large buffer (equal to the transfer length of the longest possible transfer) permanently allocated.

Turning now to a consideration of the processing of write I/O requests using the technique of the present invention, the sequence of steps is essentially the reverse of those described for a read operation. Taking the same example as already described, the application issues an I/O request which specifies nine sectors in pages A1, A2 and A3 which are to be written to sectors A to I on the disk. A corresponding nine sector I/O request is issued by the OS/2 kernel via the device manager to the scatter-gather filter along with the scatter-gather list generated by the OS/2 file system. The scatter-gather list takes the same form as shown in the above table. The filter determines from the list that the data to be written to sector is located in two discontiguous physical pages (P1 & P2) and causes the data in P1 and P2 making up sector A to be copied by the system processor into an intermediate sector buffer like buffer 100. This data is then DMA'd from the buffer into sector A on the disk. Similarly for sector I, the data making up sector I is copied by the system processor from P2 and P3 into buffer 102 and then DMA'd into sector I on the disk.

While the preferred embodiment has been described with reference to the OS/2 V2 operating system, it will be appreciated that the skilled man will be readily able to use the technique of the present invention in transferring data between other system operating with a paged memory (e.g. UNIX, MVS, VM) and secondary storage which does not include scatter-gather hardware.

We claim:

1. A method of transferring data between primary storage and secondary storage in a data processing system, said primary storage being divided into pages in both physical and virtual address spaces, comprising:

requesting from a program running on a processor in the data processing system a data transfer comprising a plurality of sectors in the virtual address space;

determining for the data transfer which requested sectors lie completely within a physical page and which requested sectors cross a boundary between first and second discontiguous physical pages;

for those sectors that lie within a physical page, transferring the sectors directly between said secondary storage and said primary storage by DMA; and for those sectors that cross the boundary between said first and second discontiguous physical pages, transferring each sector between said primary storage and said secondary storage via an intermediate buffer.

2. The method of claim 1, wherein during a data transfer from said primary storage to said secondary storage and for each sector that has been determined as crossing the boundary between said first and second discontiguous physical pages, the method further comprising:

copying, under the control of the processor, a portion of the sector from said first discontiguous physical page into the intermediate buffer and copying the remaining portion of the sector from said second discontiguous physical page into the intermediate buffer; and transferring the sector from the intermediate buffer to secondary storage by DMA.

3. The method of claim 1, wherein during a data transfer from said secondary storage to said primary storage and for each sector which crosses the boundary between said first and second discontiguous physical pages, the method further comprising:

transferring the sector to the intermediate buffer by DMA and copying a portion of the sector from the intermediate buffer to a tail of said first discontiguous physical page and copying the remaining portion of the sector from the intermediate buffer to a head of said second discontiguous physical page under the control of the processor.

4. An apparatus for transferring data between primary storage and secondary storage in a data processing system, said primary storage being divided into pages in both physical and virtual address spaces, comprising:

means for requesting from a program running on a processor in the data processing system a data transfer comprising a plurality of sectors in the virtual address space;

means for determining for the data transfer which requested sectors lie completely within a physical page and which requested sectors cross a boundary between first and second discontiguous physical pages;

for those sectors that lie within a physical page, means for transferring the sectors directly between said secondary storage and said primary storage by DMA; and for those sectors that cross the boundary between said first and second discontiguous physical pages, means for transferring each sector between said primary storage and said secondary storage via an intermediate buffer.

5. The apparatus of claim 4, wherein during a data transfer from said primary storage to said secondary storage and for each sector that has been determined as crossing the boundary between said first and second discontiguous physical pages, further comprising:

means for copying, under the control of the processor, a portion of the sector from said first discontiguous physical page into the intermediate buffer and copying the remaining portion of the sector from said second discontiguous physical page into the intermediate buffer; and means for transferring the sector from the intermediate buffer to said secondary storage by DMA.

6. The apparatus of claim 4, wherein during a data transfer from said secondary storage to said primary storage and for each sector which crosses the boundary between said first and second discontiguous physical pages, further comprising:

means for transferring the sector to the intermediate buffer by DMA and copying a portion of the sector from the intermediate buffer to a tail of said first discontiguous physical page and copying the remaining portion of the sector from the intermediate buffer to a head of said second discontiguous physical page under the control of the processor.

\* \* \* \* \*